(12) United States Patent
Shinkai et al.

(10) Patent No.: US 11,180,017 B2
(45) Date of Patent: Nov. 23, 2021

(54) DEVICE FOR DRIVING VEHICLE (71) Applicant: DENSO CORPORATION, Kariya (JP)

(72) Inventors: Tomoyuki Shinkai, Kariya (JP);
Takashi Sato, Kariya (JP); Takurou Nakaoka, Kariya (JP); Takeo Maekawa, Kariya (JP); Keiji Kondou, Kariya (JP)

(73) Assignee: DENSO CORPORATION, Kariya (JP)

( * ) Notice: Subject to any disclaimer, the term of this patent is extended or adjusted under 35 U.S.C. 154(b) by 971 days.

(21) Appl. No.: 15/748,561

(22) PCT Filed: Jul. 22, 2016

(86) PCT No.: PCT/JP2016/071497
§ 371 (c)(1),
(2) Date: Jan. 29, 2018

(87) PCT Pub. No.: WO2017/026243
PCT Pub. Date: Feb. 16, 2017

(65) Prior Publication Data
US 2018/0215248 A1    Aug. 2, 2018

(30) Foreign Application Priority Data

Aug. 7, 2015    (JP) .............................. JP2015-156830

(51) Int. Cl.
*B60K 1/02*    (2006.01)
*B60K 6/405*    (2007.10)
(Continued)

(52) U.S. Cl.
CPC ................ *B60K 6/405* (2013.01); *B60K 1/00* (2013.01); *B60K 1/02* (2013.01); *B60K 6/26* (2013.01);
(Continued)

(58) Field of Classification Search
CPC .......... B60K 6/405; B60K 17/04; B60K 6/40; B60K 1/00; B60K 1/02; B60K 6/448;
(Continued)

(56) References Cited

U.S. PATENT DOCUMENTS 5,173,425 A * 12/1992 Serdar .................... C07K 14/79
                                                        435/189
5,589,743 A * 12/1996 King .................... B60W 20/15
                                                        318/139
(Continued)

FOREIGN PATENT DOCUMENTS

EP          2949495 A1     12/2015
JP       H11-099838 A       4/1999
(Continued)

OTHER PUBLICATIONS

U.S. Appl. No. 15/748,592, filed Jan. 29, 2018 in the name of Shinkai et al.

*Primary Examiner* — David J Hlavka
(74) *Attorney, Agent, or Firm* — Oliff PLC (57)    ABSTRACT

A device for driving a vehicle including an engine that serves as a power source of the vehicle, and a transmission that is connected to the engine, the engine and the transmission being arranged transversely such that an axial direction of an output shaft of the engine accords with a right-left direction of the vehicle includes a motor generator (MG) that serves as a power source of the vehicle, and a speed reducer that is connected to the MG. The MG and at least a part of the speed reducer are arranged outside of an engine compartment that accommodates the engine and the transmission. An output shaft of the speed reducer is connected to a power transmission system, which transmits power of an output shaft of the transmission to a drive shaft (Continued)

of a vehicle wheel to be capable of transmitting its power to the power transmission system.

10 Claims, 8 Drawing Sheets

(51) Int. Cl.

| | |
|---|---|
| *B60K 6/26* | (2007.10) |
| *B60K 6/48* | (2007.10) |
| *B60K 6/52* | (2007.10) |
| *B60L 15/20* | (2006.01) |
| *B60K 17/04* | (2006.01) |
| *B60K 6/40* | (2007.10) |
| *B60K 1/00* | (2006.01) |
| *B60L 50/16* | (2019.01) |
| *B60L 50/15* | (2019.01) |
| *B60K 6/448* | (2007.10) |
| *B60K 6/387* | (2007.10) |
| *B60L 9/18* | (2006.01) |
| *B60K 17/02* | (2006.01) |
| *B60L 15/22* | (2006.01) |
| *B60K 6/54* | (2007.10) |
| *B60K 6/543* | (2007.10) |
| *B60K 1/04* | (2019.01) |
| *B60K 6/547* | (2007.10) |
| *B60K 17/16* | (2006.01) |

(52) U.S. Cl.
CPC ............... *B60K 6/387* (2013.01); *B60K 6/40* (2013.01); *B60K 6/448* (2013.01); *B60K 6/48* (2013.01); *B60K 6/52* (2013.01); *B60K 17/02* (2013.01); *B60K 17/04* (2013.01); *B60L 9/18* (2013.01); *B60L 15/20* (2013.01); *B60L 15/2054* (2013.01); *B60L 15/22* (2013.01); *B60L 50/15* (2019.02); *B60L 50/16* (2019.02); *B60K 1/04* (2013.01); *B60K 6/54* (2013.01); *B60K 6/543* (2013.01); *B60K 6/547* (2013.01); *B60K 17/16* (2013.01); *B60K 2006/4808* (2013.01); *B60K 2006/4833* (2013.01); *B60L 2220/42* (2013.01); *B60L 2260/28* (2013.01); *Y02T 10/72* (2013.01)

(58) Field of Classification Search
CPC .......... B60K 6/387; B60K 17/02; B60K 6/26; B60K 6/48; B60K 6/52; B60K 6/54; B60K 2006/4833; B60K 2006/4808; B60K 6/543; B60K 1/01; B60K 6/547; B60K 17/16; B60L 15/20; B60L 15/2054; B60L 50/16; B60L 50/15; B60L 15/22; B60L 9/18; B60L 2260/28; B60L 2220/42
See application file for complete search history.

(56) References Cited

U.S. PATENT DOCUMENTS

| | | | |
|---|---|---|---|
| 6,041,877 | A | 3/2000 | Yamada et al. |
| 7,256,510 | B2 * | 8/2007 | Holmes ............. B60W 10/08 290/45 |
| 9,293,957 | B2 | 3/2016 | Takizawa et al. |
| 2002/0019284 | A1 * | 2/2002 | Aikawa ............. B60K 6/547 475/150 |
| 2002/0043881 | A1 | 4/2002 | Asao et al. |

FOREIGN PATENT DOCUMENTS

| | | |
|---|---|---|
| JP | 2001-173762 A | 6/2001 |
| JP | 2002-160540 A | 6/2002 |
| JP | 2004-048939 A | 2/2004 |
| JP | 2005-306137 A | 11/2005 |
| JP | 2008-193821 A | 8/2008 |
| JP | 2009-274512 A | 11/2009 |
| JP | 2010-098851 A | 4/2010 |
| JP | 2011-037296 A | 2/2011 |
| JP | 2011-093458 A | 5/2011 |
| JP | 2012-222983 A | 11/2012 |

\* cited by examiner

DEVICE FOR DRIVING VEHICLE

CROSS REFERENCE TO RELATED APPLICATION

This application is based on Japanese Patent Application No. 2015-156830 filed on Aug. 7, 2015, the disclosure of which is incorporated herein by reference.

TECHNICAL FIELD

The present disclosure relates to a device for driving a vehicle including an engine and a motor generator as a power source of the vehicle.

BACKGROUND ART

Recent years, a hybrid vehicle including an engine and a motor generator (hereinafter referred to as MG) as a power source of the vehicle has attracted attention to meet the social demands for low fuel consumption and low exhaust emission. As such a hybrid vehicle, for example, there is a vehicle described in Patent Document 1 (JP 3350314 B2). This vehicle is configured such that a transmission is connected to an engine via a clutch, and the drive shaft of a wheel is connected to an output shaft of this transmission via a differential gear (differential gear mechanism), and that an output shaft of the MG is connected to a ring gear of the differential gear via a transfer for a four-wheel drive vehicle to be able to transmit the power of the MG to the drive shaft

PRIOR ART DOCUMENT

Patent Document

Patent Document 1: JP 3350314 B2

To meet the demands for low fuel consumption and low exhaust emission of the hybrid vehicle, an EV travel (including an EV start for starting a vehicle only by the power of the MG) for making the vehicle travel only by the power of the MG, out of the engine and the MG, is an important function. However, the art of Patent Document 1 described above employs the configuration that connects the output shaft of the MG directly to the transfer without a deceleration mechanism therebetween. Thus, a small-sized MG may not produce the shaft torque (torque of the drive shaft) required for the EV travel, and the EV travel, which is an important function of the hybrid vehicle, is difficult to achieve. In addition, the MG needs to grow in size to generate the shaft torque required for the EV travel, and in this case, a space for disposing the MG becomes difficult to secure.

SUMMARY OF INVENTION

It is an objective of the present disclosure to provide a device for driving a vehicle that can achieve an EV travel even by a small-sized MG and that can easily secure a space for disposing the MG.

To achieve the objective, a device in a first aspect of the present disclosure is for driving a vehicle including an engine that serves as a power source of the vehicle, and a transmission that is connected to the engine, the engine and the transmission being arranged transversely such that an axial direction of an output shaft of the engine accords with a right-left direction of the vehicle. The device includes a motor generator (MG) that serves as a power source of the vehicle, and a speed reducer that is connected to the MG. The MG and at least a part of the speed reducer are arranged outside of an engine compartment that accommodates the engine and the transmission. An output shaft of the speed reducer is connected to a power transmission system, which transmits power of an output shaft of the transmission to a drive shaft of a vehicle wheel, to be capable of transmitting power to the power transmission system.

This configuration can transmit the power of the MG to the drive shaft of vehicle wheels via the speed reducer. Thus, even the small-sized MG can generate the shaft torque required for the EV travel to achieve the EV travel, which is an important function of the hybrid vehicle. This can downsize the MG, and furthermore, the configuration that arranges the MG and at least a part of the speed reducer outward of the engine compartment can easily secure a space for disposing the MG and the speed reducer. Consequently, even when producing the hybrid vehicle based on an engine vehicle (vehicle with its engine alone serving as a power source) in which the engine and the transmission are arranged transversely, the hybrid vehicle that can achieve the EV travel can be produced with little change of the body structure of the basic engine vehicle.

There are also the following advantages. Even though the drive system of the MG fails to operate properly, the power of the engine can be transmitted to the drive shaft via the transmission. Thus, the vehicle can sufficiently self-travel (travel under its own power) by the power of the engine. The vehicle can produce driving force equal to or greater than the basic engine vehicle even under high-load conditions such as towing. The MG is disposed outward of the engine compartment (i.e., near the center of the vehicle body). Thus, even if the vehicle has a collision accident, for example, the damage to the MG can be reduced, and the exposure of the MG to the outside of the vehicle can be prevented to reduce the possibility of an electric shock accident.

In the configuration that transmits the power of the MG to the drive shaft via the speed reducer, particularly, in the case of the small-sized MG, the heat generation amount tend to become large. When the MG is put into an overheating state by the heat generation of the MG, the drive of the MG needs to be limited.

Accordingly, as in a second aspect of the present disclosure, a liquid refrigerant may be sealed in a case of the MG so that the refrigerant does not circulate to communicate with outside of the MG. Consequently, the heat inside the MG can be conducted efficiently to the case through the refrigerant to be released to the outside of the MG, thereby effectively cooling the MG. This can prevent overheating of the MG to allow for more highly-loaded and longer drive of the MG. Moreover, the refrigerant dispersing and pervading in the case of the MG also promotes the cooling of the stator and the rotor. Thus, a high cooling effect can be produced at low cost without providing complicated flow passages in the case of the MG. Also, there is no need to provide a circulating passage through which the refrigerant circulates to communicate with the outside of the MG, so that the installability of the MG on the vehicle can be improved. Furthermore, the refrigerant can be supplied as a lubricating oil for bearings necessary at the time of high speed rotation of the MG, and thus a mechanical lifetime of the MG can also be prolonged with the effect of cooling the MG enhanced. Additionally, the vibration due to the rotation of the MG can also be attenuated to make improvement in quietness.

In this case, as in a third aspect of the present disclosure, the MG includes a stator winding wire, which may be a segment-type winding wire that is formed by joining a plurality of conductor segments. This configuration forms appropriate clearances between the winding wires of the stator winding wire (i.e., between the conductor segments), and the refrigerant enters easily into the clearances, so that the efficiency of heat transfer between the stator winding wire and the case through the refrigerant can be improved.

As in a fourth aspect of the present disclosure, a material having insulating properties may be used for the refrigerant. This configuration can prevent a short circuit via the refrigerant in the case of the MG even when a defect occurs in the insulation film of a conductive component in the case of the MG or when conductive components are damaged.

As in a fifth aspect of the present disclosure, the refrigerant may be stored in the case of the MG up to at least a position where a bottom surface side of an outer peripheral part of a rotor of the MG is submerged. Consequently, the refrigerant is scooped up by the rotation of the rotor to be mixed with air, and the shearing resistance at the time of contact between the rotor being rotated and the refrigerant can be reduced to decrease the rotational resistance of the rotor, improving the efficiency of the MG. In addition, the foam-shaped refrigerant mixed with air spreads to every corner of the inside of the case of the MG. Thus, the entire surface of the case can be made the most of for heat transfer and heat release, and the refrigerant can be applied also to the coil end part, the neutral point, and the lead-out wire of the winding wire to produce an excellent cooling effect.

Or, as in a sixth aspect of the present disclosure, a solid for heat release may be disposed in a case of the MG to be in contact with at least a coil end part of a stator winding wire of the MG and an inner surface of the case. Consequently, the heat of the coil end part of the stator winding wire of the MG can be conducted efficiently to the case through the solid to be released to the outside of the MG, and thus the MG can be cooled effectively. This can prevent overheating of the MG to allow for more highly-loaded and longer drive of the MG. Moreover, the coil end part of the stator winding wire can be held by the solid, to thereby prevent the coil end part from vibrating due to its excitation to make noises. Furthermore, the damage to the coil end part and its insulation film by the vibration of an engine or the vehicle body can be prevented.

In this case, as in a seventh aspect of the present disclosure, the stator winding wire of the MG may be a segment-type winding wire that is formed by joining a plurality of conductor segments. This configuration forms appropriate clearances between the winding wires of the stator winding wire (i.e., between the conductor segments). The material in a liquid state enters easily into the clearances at the time of molding of the solid, and the efficiency of heat transfer between the stator winding wire and the case through the solid can thereby be improved.

As in an eighth aspect of the present disclosure, a material having insulating properties may be used for the solid. This configuration can prevent a short circuit via the solid in the case of the MG even when a defect occurs in the insulation film of the coil end part. Because the solid having insulating properties is present, insulating properties between the coil end part and the case are enhanced. Thus, the distance between the coil end part and the case can be reduced to increase the effect of heat release to the case and to downsize the MG.

As in a ninth aspect of the present disclosure, the solid may be disposed not to be in contact with a rotation member of the MG. This configuration can prevent the increase of rotational resistance of the MG.

As in a tenth aspect of the present disclosure, the device may further include a battery that is disposed in the vehicle, an inverter that drives the MG, and a boost converter that boosts a voltage of the battery to make an input voltage of the inverter higher than the voltage of the battery. This configuration can drive the MG by a high voltage that is higher than the voltage of the battery thereby to improve the efficiency of the MG in a high speed region of the vehicle (i.e., high rotation region of the MG). Thus, fuel efficiency can be further improved. Furthermore, the amount of the battery disposed can be minimized, and the increase in vehicle weight and cost can be curbed.

As in an eleventh aspect of the present disclosure, Tmax, Pmax, and GRtotal may be set such that Tmax, Pmax, GRtotal, IW, and Rtyre satisfy relationships of the following expression (1) and the following expression (2). Tmax is a maximum torque of the MG. Pmax is a maximum output of the MG. GRtotal is a total speed reduction ratio that is determined by a speed reduction ratio of the speed reducer and a final speed reduction ratio. IW is a weight of the vehicle. Rtyre is a tire radius of the vehicle.

$$Tmax \times GRtotal > IW \times 1.05 \times Rtyre \quad (1)$$

$$Pmax > |20.61 \times (-0.79) \times IW| \quad (2)$$

By setting the maximum torque Tmax of the MG and the total speed reduction ratio GRtotal to satisfy the relationship of the above expression (1), the EV start can be performed at a practical acceleration as a hybrid vehicle. By setting the maximum output Pmax of the MG to satisfy the relationship of the above expression (2), the regeneration power (generated electric power) when performing the regenerative power generation by the MG at the time of vehicle deceleration can reach a practical level as a hybrid vehicle.

As in a twelfth aspect of the present disclosure, outer diameters of the MG and the speed reducer may be set such that the MG and at least an upper part side of the speed reducer are accommodated in a floor tunnel formed on a floor panel of the vehicle, and that the lowest surfaces of the MG and the speed reducer are located on an upper side of the lowest surface of the vehicle including the floor panel and an assembling part. This configuration can dispose the MG and the speed reducer using the existing floor tunnel with little change of the body structure of the basic engine vehicle. Since the lowest surfaces of the MG and the speed reducer are located on an upper side of the lowest surface of the vehicle including the floor panel and assembling parts (excluding parts such as resin and rubber subject to deformation), the contact between the MG and the speed reducer, and a road surface can be averted.

As in a thirteenth aspect of the present disclosure, a clutch may be provided between the output shaft of the speed reducer and the power transmission system. This configuration can eliminate the energy loss due to the co-rotation of an MG and the speed reducer (i.e., energy loss due to the rotation load of the MG and the speed reducer) by disconnecting the clutch if needed. Furthermore, when the MG is failed, the vehicle can continue to self-travel by an engine by detaching the clutch. In addition, the maximum rotation speed of the speed reducer and the MG does not need to correspond up to the vehicle maximum speed, and thus the system can be configured at a lower cost.

As in a fourteenth aspect of the present disclosure, the MG and the speed reducer may be provided to drive one of a front wheel and a rear wheel of the vehicle. The device may further include an MG and a speed reducer that drive the other one of the front wheel and the rear wheel of the vehicle, separately from the MG and the speed reducer. This configuration can make the vehicle four-wheel-drive thereby to improve its traveling performance and stability on a rough road or on a slippery road surface. Additionally, the power required for the EV travel can be divided by the two motor generators: front MG and rear MG. Thus, depending on the vehicle speed and acceleration, using efficiently the two MGs can reduce the electric power consumption.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments will be described below.

First Embodiment

A first embodiment will be described with reference to FIGS. 1 to 5. First, a general configuration of a drive system of a hybrid vehicle will be explained with reference to FIGS. 1 and 2.

Figure 1:
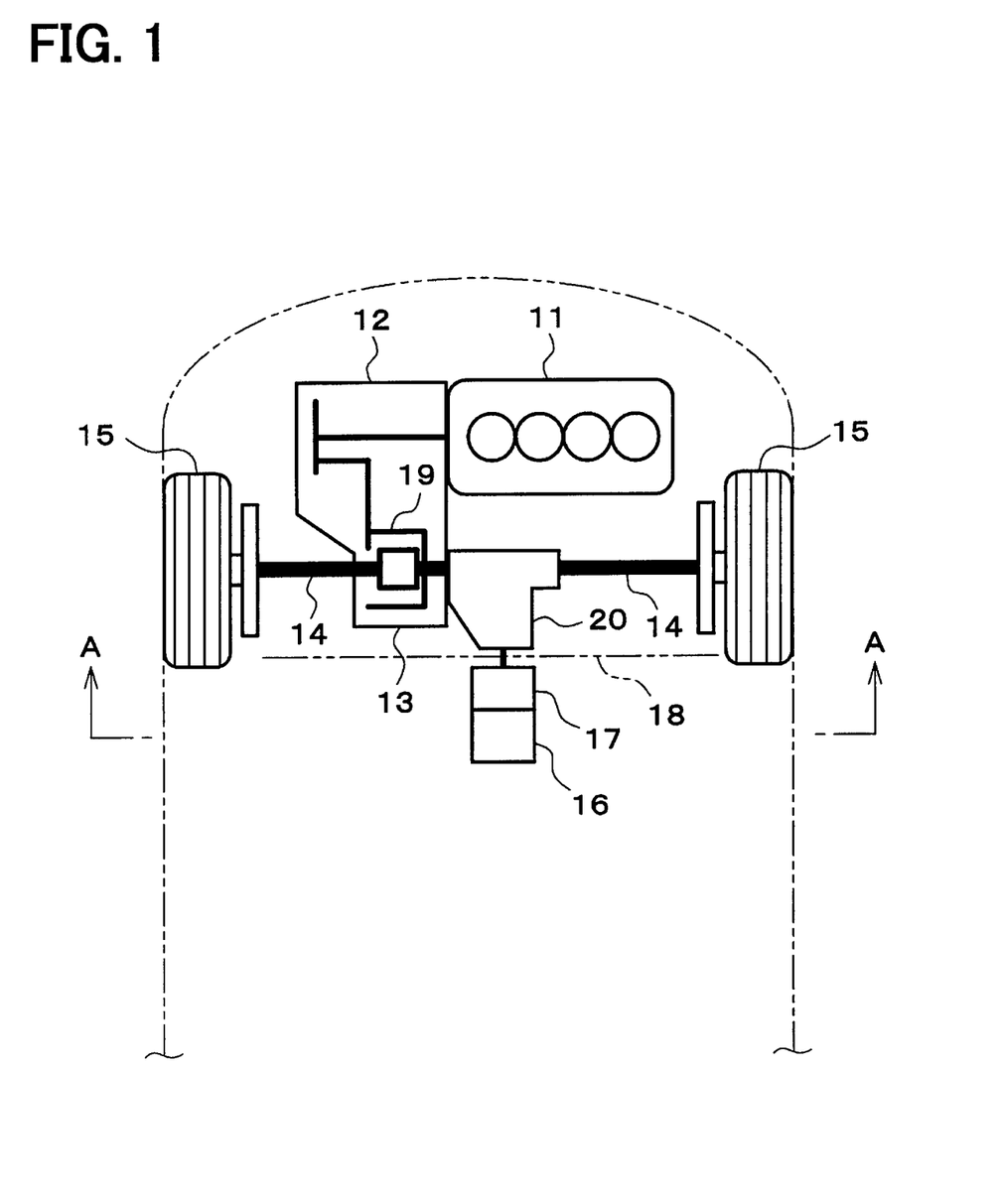
FIG. 1 is a diagram illustrating a general configuration of a drive system of a hybrid vehicle in accordance with a first embodiment.

As illustrated in FIG. 1, an engine 11 serving as a power source of the vehicle and a transmission 12 that is connected to this engine 11 are disposed in a front side part of the vehicle. The transmission 12 is a mechanical transmission, and may be a stepped transmission that switches the shift gear stage in a stepwise manner between more than one shift gear stage, or a continuously variable transmission (CVT) that shifts gears in a stepless manner. The engine 11 and the transmission 12 are arranged transversely such that the axial direction of an output shaft (crankshaft) of the engine 11 accords with the right-left direction of the vehicle. The power of the output shaft of the engine 11 is transmitted to the transmission 12, and the power of an output shaft of this transmission 12 is transmitted to a drive shaft 14 of front wheels 15 (vehicle wheels) via a differential gear mechanism 13 and so forth.

A small-diameter motor generator (hereinafter referred to as an MG) 16 serving as a power source of the vehicle, and a small-diameter speed reducer 17 connected to this MG 16 are disposed on a rear side of the engine 11 and the transmission 12. The MG 16 and the speed reducer 17 are arranged outside of an engine compartment that accommodates the engine 11 and the transmission 12 (e.g., on a rear side of a dash panel 18 dividing the engine compartment from a passenger compartment).

The MG 16 and the speed reducer 17 are arranged longitudinally such that the axial direction of their output shaft accords with the front-rear direction of the vehicle. The output shaft of the speed reducer 17 is connected to a ring gear 19 of the differential gear mechanism 13 (gear into which the power of the output shaft of the transmission 12 is inputted) via a transfer 20 for a four-wheel drive vehicle. Consequently, the power of the output shaft of the MG 16 is transmitted to the speed reducer 17, and the power of the output shaft of this speed reducer 17 is transmitted to the drive shaft 14 of the front wheels 15 via the transfer 20, the differential gear mechanism 13, and so forth.

Figure 2:
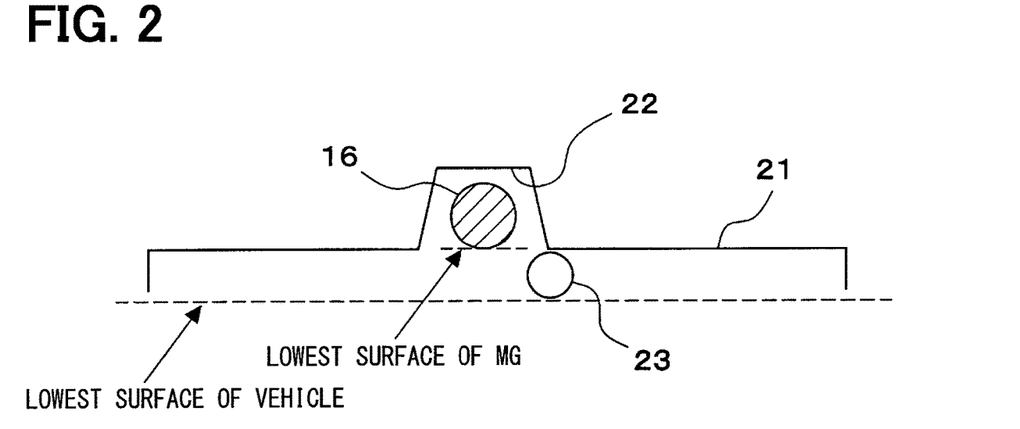
FIG. 2 is a cross-sectional view taken along a line A-A in FIG. 1.

As illustrated in FIG. 2, a floor tunnel 22 extending in the front-rear direction of the vehicle is formed on a floor panel 21 of the vehicle, and the MG 16 and the speed reducer 17 are arranged along this floor tunnel 22. The outer diameters of the MG 16 and the speed reducer 17 are set such that the MG 16 and at least the upper part side (preferably entire part) of the speed reducer 17 are accommodated in the floor tunnel 22, and that the lowest surfaces of the MG 16 and the speed reducer 17 are located on an upper side of the lowest surface of the vehicle including the floor panel 21 and assembling parts such as an exhaust pipe 23 (excluding parts such as resin and rubber subject to deformation).

The above-configured drive system of the hybrid vehicle switches the travel mode between an engine travel mode, an HV travel mode, and an EV travel mode, for example. The engine travel mode is a mode in which to perform an engine travel to drive the front wheels 15 only by the power of the engine 11, out of the engine 11 and the MG 16, to travel the vehicle. The HV travel mode is a mode in which to perform an HV travel to drive the front wheels 15 by both the power of the engine 11 and the power of the MG 16, to travel the vehicle. The EV travel mode is a mode in which to perform an EV travel to drive the front wheels 15 only by the power of the MG 16, out of the engine 11 and the MG 16, to travel the vehicle (including an EV start for starting the vehicle only by the power of the MG 16). At the time of vehicle deceleration, the regenerative power generation that converts the kinetic energy of the vehicle into electrical energy by the MG 16 to charge (recover) a battery 33 (see FIG. 5) is performed.

Figure 3:
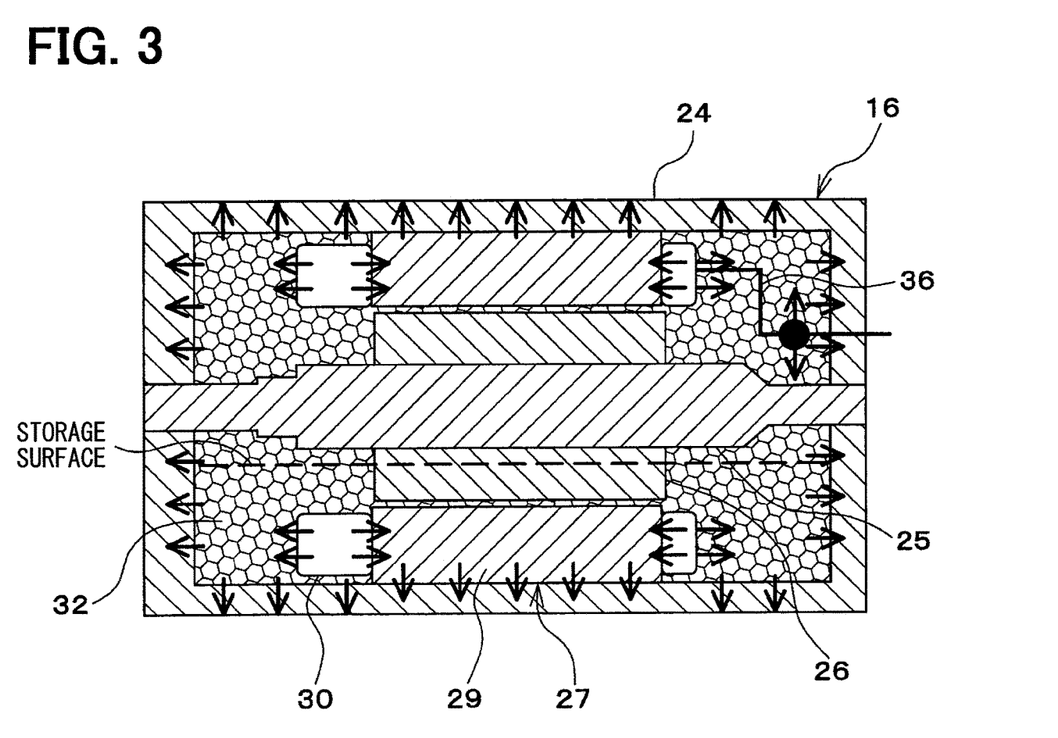
FIG. 3 is a sectional view illustrating a general configuration of an MG according to the first embodiment.

Next, the general configuration of the MG 16 will be explained with reference to FIGS. 3 and 4. As illustrated in FIG. 3, a rotor 26 that rotates integrally with a rotation shaft 25 and a stator 27 that is disposed outward of this rotor 26 are provided in a case 24 of the MG 16. The stator 27 includes a stator core 29 that includes slots 28 (see FIG. 4) in its circumferential direction, and a stator winding wire 30 that has phase winding wires, which are wound on this stator core 29.

Figure 4:
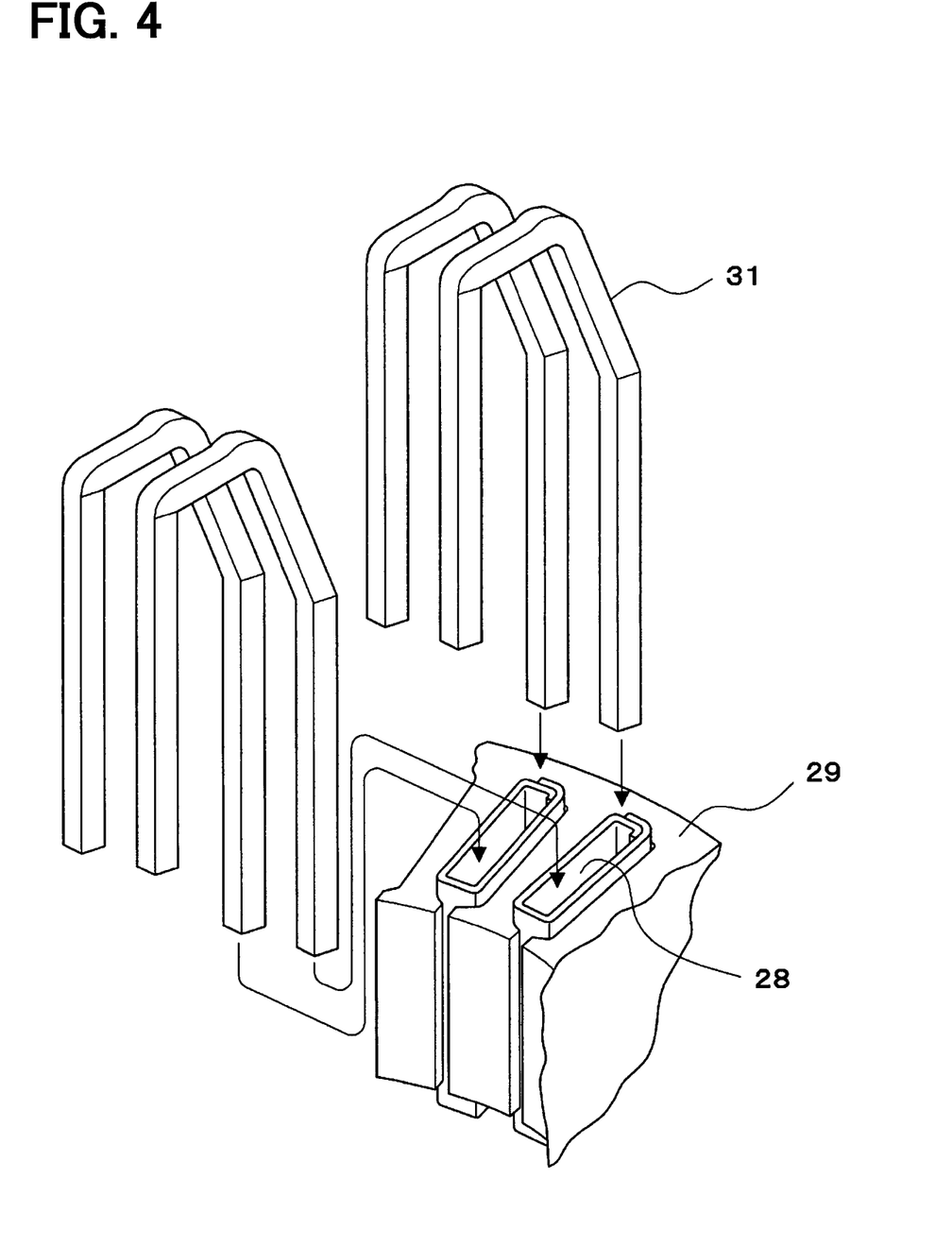
FIG. 4 is a diagram illustrating a stator winding wire according to the first embodiment.

As illustrated in FIG. 4, the stator winding wire 30 is a segment-type winding wire that is formed by inserting generally U-shaped conductor segments 31 in a predetermined pattern from one side of the corresponding slots 28, and joining in a predetermined pattern the end parts of the conductor segments 31, which extend out of the other side of the slots 28.

As illustrated in FIG. 3, a liquid refrigerant 32 is enclosed within the case 24 of the MG 16 not to communicate with the outside of the MG 16. Consequently, as indicated by arrows in FIG. 3, the heat inside the MG 16 can be conducted to the case 24 through the refrigerant 32 to be released to the outside of the MG 16. As indicated by a dashed line in FIG. 3, the refrigerant 32 is stored in the case 24 of the MG 16 up to at least the position where the bottom surface side of the outer peripheral part of the rotor 26 is soaked (e.g., position slightly lower than the rotation shaft 25) in a state where the MG 16 is stopped. Accordingly, when the MG 16 rotates, the refrigerant 32 is scooped up by the rotation of the rotor 26 to be mixed with air, and the foam-shaped refrigerant 32 spreads to every corner of the inside of the case 24 of the MG 16.

The refrigerant 32 is a liquid having insulating properties, and lubricating oil for an automobile, such as automatic transmission fluid (ATF: operating oil for an automatic transmission), is used for the refrigerant 32. Generally, a defoaming agent for restricting foam formation is often added to the lubricating oil for an automobile to achieve a sufficient lubrication function. However, since the present embodiment uses a state where lubricating oil is mixed with air, the defoaming agent may not be added, or the amount of the defoaming agent added may be adjusted within the range in which a desirable foam formation is caused.

Figure 5:
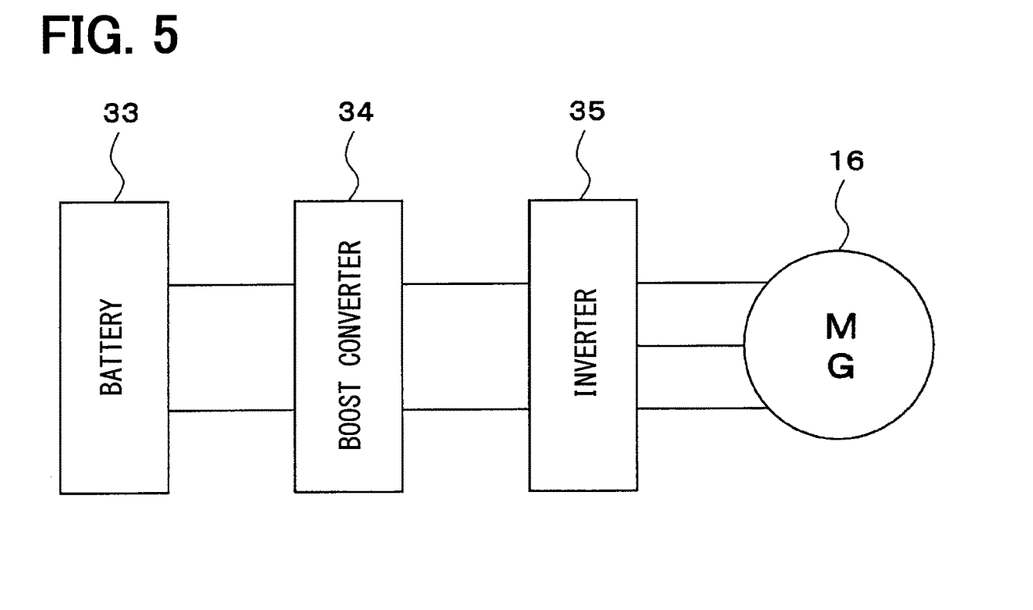
FIG. 5 is a block diagram illustrating a general configuration of an MG drive system according to the first embodiment.

Subsequently, a general configuration of a drive system of the MG 16 will be explained with reference to FIG. 5. The battery 33 disposed in the vehicle and an inverter 35 that drives the MG 16 are connected via a boost converter 34, and the MG 16 gives or receives electric power to or from the battery 33 via the boost converter 34 and the inverter 35. The battery 33 is a direct current power supply including a secondary battery. The boost converter 34 boosts the direct-current voltage of the battery 33 to make the input voltage of the inverter 35 higher than the direct-current voltage of the battery 33. The inverter 35 converts the direct-current voltage boosted by the boost converter 34 into an alternating-current voltage to drive the MG 16.

Consequently, the MG 16 can be driven by a high voltage that is higher than the voltage of the battery 33 thereby to improve the efficiency of the MG 16 in a high speed region of the vehicle (i.e., high rotation region of the MG 16). Thus, fuel efficiency can be further improved. Furthermore, the amount of the battery 33 disposed can be minimized, and the increase in vehicle weight and cost can be curbed.

In this first embodiment, a maximum torque Tmax of the MG 16 and a total speed reduction ratio GRtotal are set such that the maximum torque Tmax of the MG 16, the total speed reduction ratio GRtotal, a vehicle weight IW, and a tire radius Rtyre of the front wheel 15 of the vehicle satisfy the relationship of the expression (1) below. The total speed reduction ratio GRtotal is a speed reduction ratio that is determined by a speed reduction ratio of the speed reducer 17 and a final speed reduction ratio (e.g., speed reduction ratio at the transfer 20).

$$T\max \times GR\text{total} > IW \times 1.05 \times R\text{tyre} \tag{1}$$

The above expression (1) is a condition for making the start torque at the time of performing the EV start to start the vehicle only by the power of the MG 16 larger than a predetermined lower limit torque. The lower limit torque is set based on the required start torque of NEDC whose required start torque is the smallest, out of JC08, NEDC, LA #4, US06, and WLTP, which specify a travel pattern for measurement of fuel efficiency and emission gas. Thus, by setting the maximum torque Tmax of the MG 16 and the total speed reduction ratio GRtotal (speed reduction ratio of the speed reducer 17) to satisfy the relationship of the above expression (1), the EV start can be performed at a practical acceleration as a hybrid vehicle.

In addition, a maximum output Pmax of the MG 16 is set such that the maximum output Pmax of the MG 16, and the vehicle weight IW satisfy the relationship of the expression (2) below.

$$P\max > |20.61 \times (-0.79) \times IW| \tag{2}$$

The above expression (2) is a condition for making the regeneration power (generated electric power) when performing the regenerative power generation by the MG 16 at the time of vehicle deceleration larger than a predetermined lower limit power. The lower limit power is set based on the regeneration power of JC08 whose regeneration power is the smallest, out of JC08, NEDC, LA #4, US06, and WLTP. Thus, by setting the maximum output Pmax of the MG 16 to satisfy the relationship of the above expression (2), the regeneration power when performing the regenerative power generation by the MG 16 at the time of vehicle deceleration can reach a practical level as a hybrid vehicle.

According to the above-described present first embodiment, in the drive system in which the engine 11 and the transmission 12 are arranged transversely, the MG 16 and the speed reducer 17 are arranged outside the engine compartment that accommodates the engine 11 and the transmission 12. The output shaft of the speed reducer 17 is connected to the ring gear 19 of the differential gear mechanism 13 (gear into which the power of the output shaft of the transmission 12 is inputted) via the transfer 20.

This can transmit the power of the MG 16 to the drive shaft 14 of the front wheels 15 via the speed reducer 17. Thus, even the small-sized MG 16 can generate the shaft torque required for the EV travel (torque of the drive shaft 14) to achieve the EV travel, which is an important function of the hybrid vehicle. This can downsize the MG 16, and furthermore, the configuration that arranges the MG 16 and the speed reducer 17 outward of the engine compartment can easily secure a space for disposing the MG 16 and the speed reducer 17. Consequently, even when producing the hybrid vehicle based on an engine vehicle (vehicle with its engine alone serving as a power source) in which the engine 11 and the transmission 12 are arranged transversely, the hybrid vehicle that can achieve the EV travel can be produced with little change of the body structure of the basic engine vehicle.

Even though the drive system of the MG 16 (e.g., the MG 16, the boost converter 34, and the inverter 35) fails to operate properly, the power of the engine 11 can be transmitted to the drive shaft 14 via the transmission 12. Thus, the vehicle can sufficiently self-travel (travel under its own power) by the power of the engine 11. Moreover, the vehicle can produce driving force equal to or greater than the basic engine vehicle even under high-load conditions such as towing. The MG 16 is disposed outward of the engine compartment (i.e., near the center of the vehicle body). Thus, even if the vehicle has a collision accident, for example, the damage to the MG 16 can be reduced, and the exposure of the MG 16 to the outside of the vehicle can be prevented to reduce the possibility of an electric shock accident.

In the present first embodiment, the outer diameters of the MG 16 and the speed reducer 17 are set such that the MG 16 and at least the upper part side of the speed reducer 17 are accommodated in the floor tunnel 22 formed on the floor panel 21 of the vehicle, and that the lowest surfaces of the MG 16 and the speed reducer 17 are located on an upper side of the lowest surface of the vehicle. Consequently, the MG 16 and the speed reducer 17 can be disposed using the existing floor tunnel 22 with little change of the body structure of the basic engine vehicle. Since the lowest surfaces of the MG 16 and the speed reducer 17 are located on an upper side of the lowest surface of the vehicle, the contact between the MG 16 and the speed reducer 17, and a road surface can be averted.

In the present first embodiment, the liquid refrigerant 32 is sealed within the case 24 of the MG 16 not to communicate with the outside of the MG 16. Consequently, the heat inside the MG 16 can be conducted efficiently to the case 24 through the refrigerant 32 to be released to the outside of the MG 16, thereby effectively cooling the MG 16. This can prevent overheating of the MG 16 to allow for more highly-loaded and longer drive of the MG 16. Moreover, the refrigerant 32 dispersing and pervading in the case 24 of the MG 16 also promotes the cooling of the stator 27 and the rotor 26. Thus, a high cooling effect can be produced at low cost without providing complicated flow passages in the case 24 of the MG 16. Also, there is no need to provide a circulating passage through which the refrigerant 32 circulates to communicate with the outside of the MG 16, so that the installability of the MG 16 on the vehicle can be improved. Furthermore, the refrigerant 32 can be supplied as a lubricating oil for bearings necessary at the time of high speed rotation of the MG 16, and thus a mechanical lifetime of the MG 16 can also be prolonged with the effect of cooling the MG 16 enhanced. Additionally, the vibration due to the rotation of the MG 16 can also be attenuated to make improvement in quietness.

As the stator winding wire 30 of the MG 16, the present first embodiment uses the segment-type winding wire that is formed by joining generally U-shaped conductor segments 31 in a predetermined pattern. This forms appropriate clearances between the winding wires of the stator winding wire 30 (i.e., between the conductor segments 31), and the refrigerant 32 enters easily into the clearances, so that the efficiency of heat transfer between the stator winding wire 30 and the case 24 through the refrigerant 32 can be improved.

The present first embodiment uses a material having insulating properties for the refrigerant 32. This can prevent a short circuit via the refrigerant 32 in the case 24 of the MG 16 even when a defect occurs in the insulation film of a conductive component (e.g., stator winding wire 30) in the case 24 of the MG 16 or when conductive components are damaged.

The present first embodiment stores the refrigerant 32 in the case 24 of the MG 16 up to at least the position where the bottom surface side of the outer peripheral part of the rotor 26 is submerged. Consequently, the refrigerant 32 is scooped up by the rotation of the rotor 26 to be mixed with air, and the shearing resistance at the time of contact between the rotor 26 being rotated and the refrigerant 32 can be reduced to decrease the rotational resistance of the rotor 26, improving the efficiency of the MG 16. In addition, the foam-shaped refrigerant 32 mixed with air spreads to every corner of the inside of the case 24 of the MG 16. Thus, the entire surface of the case 24 can be made the most of for heat transfer and heat release, and the refrigerant 32 can be applied also to the coil end part (part projecting from the axial end surface of the stator core 29), the neutral point, and the lead-out wire 36 of the stator winding wire 30 to produce an excellent cooling effect.

Second Embodiment

A second embodiment will be described with reference to FIG. 6. Substantially the same part as the above first embodiment is given the same corresponding reference numeral to leave out or simplify its description, and different parts from the first embodiment will be mainly explained.

Figure 6:
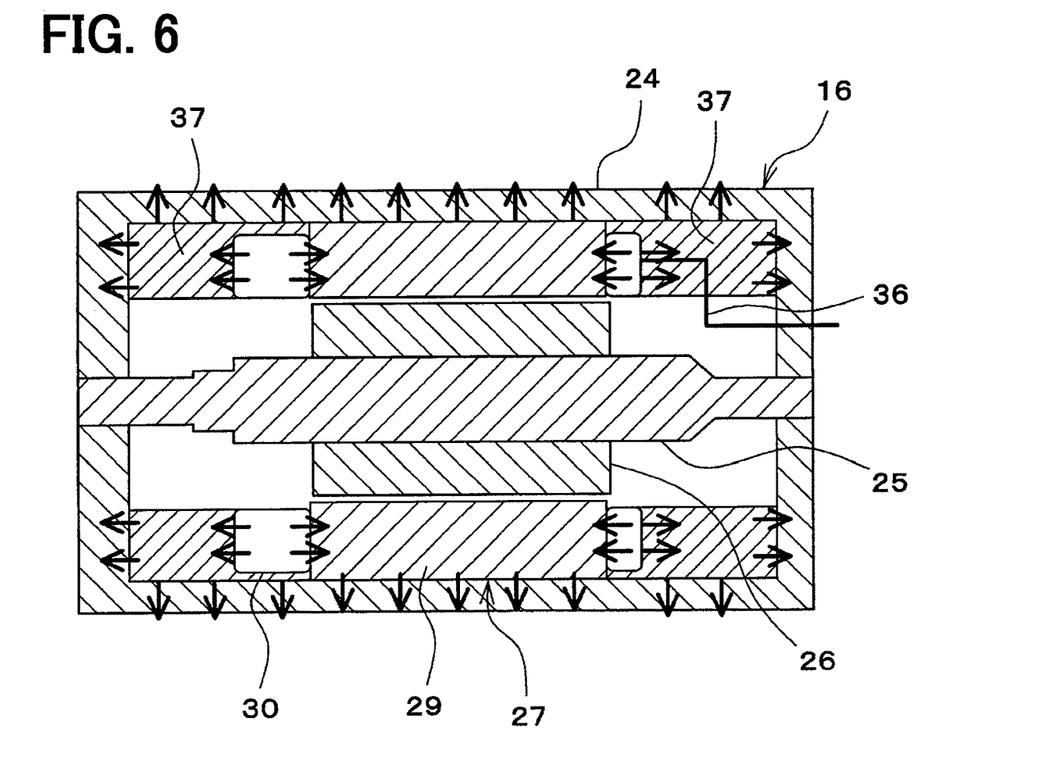
FIG. 6 is a sectional view illustrating a general configuration of an MG in accordance with a second embodiment.

In the present second embodiment, solids 37 for heat release are provided respectively on both sides of a stator core 29 in its axial direction in a case 24 of an MG 16, as illustrated in FIG. 6. This solid 37 is disposed to be in contact with at least the coil end part of a stator winding wire 30 (part projecting from the axial end surface of the stator core 29) and the inner surface of the case 24 (inner peripheral surface and axial inner surface). Consequently, as indicated by arrows in FIG. 6, the heat of the coil end part of the stator winding wire 30 of the MG 16 can be conducted to the case 24 through the solid 37 to be released to the outside of the MG 16. The solid 37 is formed in an approximately cylindrical shape from, for example, resin having insulating properties, and is disposed not to be in contact with a rotation shaft 25 and a rotor 26, which are rotation members of the MG 16.

In the above-described present second embodiment, the solid 37 for heat release is disposed to be in contact with at least the coil end part of the stator winding wire 30 and the inner surface of the case 24 in the case 24 of the MG 16. Consequently, the heat of the coil end part of the stator winding wire 30 of the MG 16 can be conducted efficiently to the case 24 through the solid 37 to be released to the outside of the MG 16, and thus the MG 16 can be cooled effectively. This can prevent overheating of the MG 16 to allow for more highly-loaded and longer drive of the MG 16. Moreover, the coil end part of the stator winding wire 30 can be held by the solid 37, thereby to prevent the coil end part from vibrating due to its excitation to make noises. Furthermore, the damage to the coil end part and its insulation film by the vibration of an engine 11 or the vehicle body can be prevented.

For the stator winding wire 30 of the MG 16, the present second embodiment uses the segment-type winding wire that is formed by joining generally U-shaped conductor segments 31 in a predetermined pattern. This forms appropriate clearances between the winding wires of the stator winding wire 30 (i.e., between the conductor segments 31). Consequently, the material of the solid 37 in a liquid state enters easily into the clearances to fills up the clearances with the solid 37 at the time of molding, and the efficiency of heat transfer between the stator winding wire 30 and the case 24 through the solid 37 can be improved.

The present second embodiment uses a material having insulating properties for the solid 37. This can prevent a short circuit via the solid 37 in the case 24 of the MG 16 even when a defect occurs in the insulation film of the coil end part. Because the solid 37 having insulating properties is present, insulating properties between the coil end part and the case 24 are enhanced. Thus, the distance (e.g., axial interval) between the coil end part and the case 24 can be reduced to increase the effect of heat release to the case 24 and to downsize the MG 16.

Additionally, the present second embodiment disposes the solids 37 not to be in contact with the rotation shaft 25 and the rotor 26, which are rotation members of the MG 16. Thus, the increase of rotational resistance of the MG 16 can be prevented.

Third Embodiment

A third embodiment will be described with reference to FIGS. 7 and 8. Substantially the same part as the above first embodiment is given the same corresponding reference numeral to leave out or simplify its description, and different parts from the first embodiment will be mainly explained.

Figure 7:
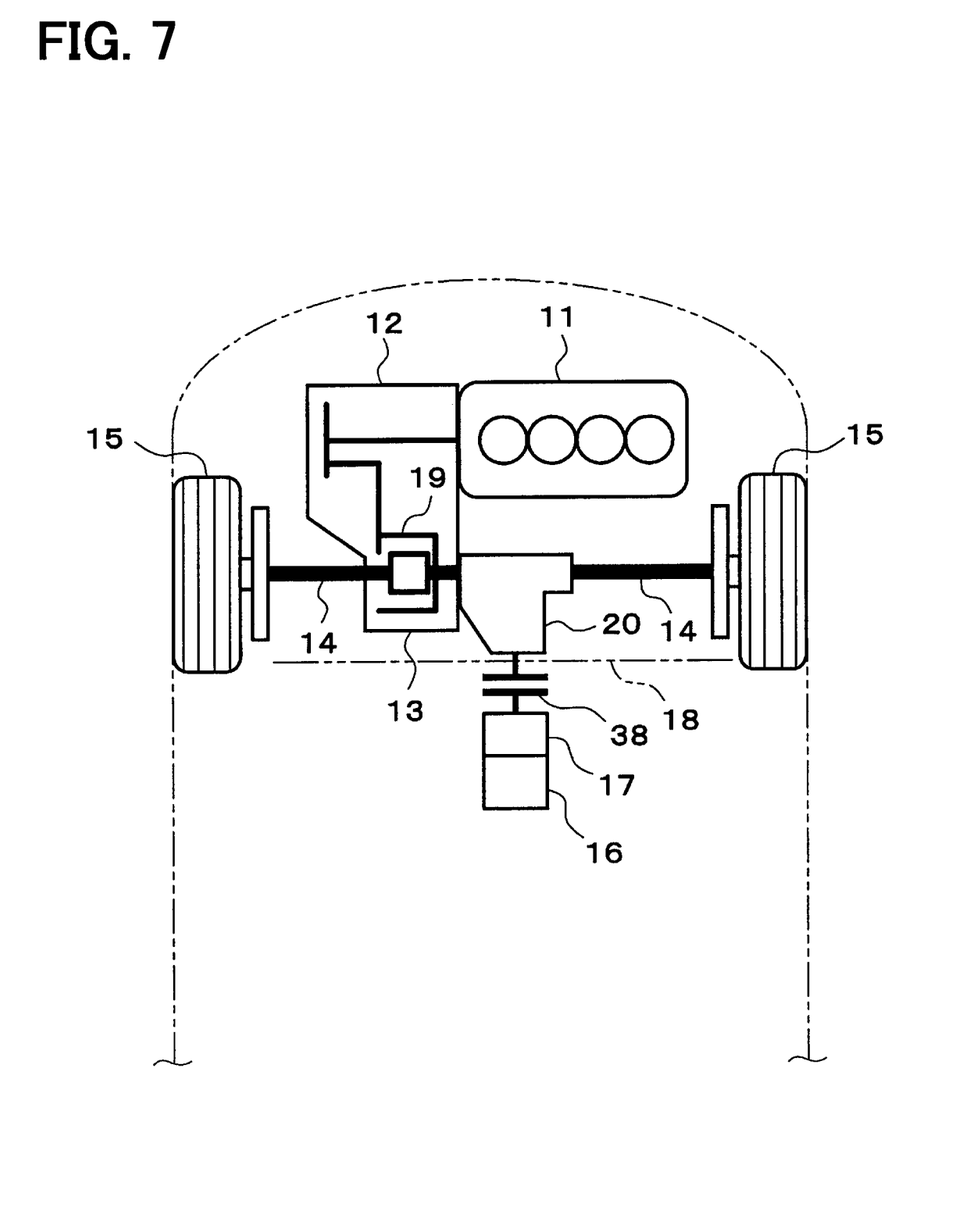
FIG. 7 is a diagram illustrating a general configuration of a drive system of a hybrid vehicle in accordance with a third embodiment (1)
Figure 8:
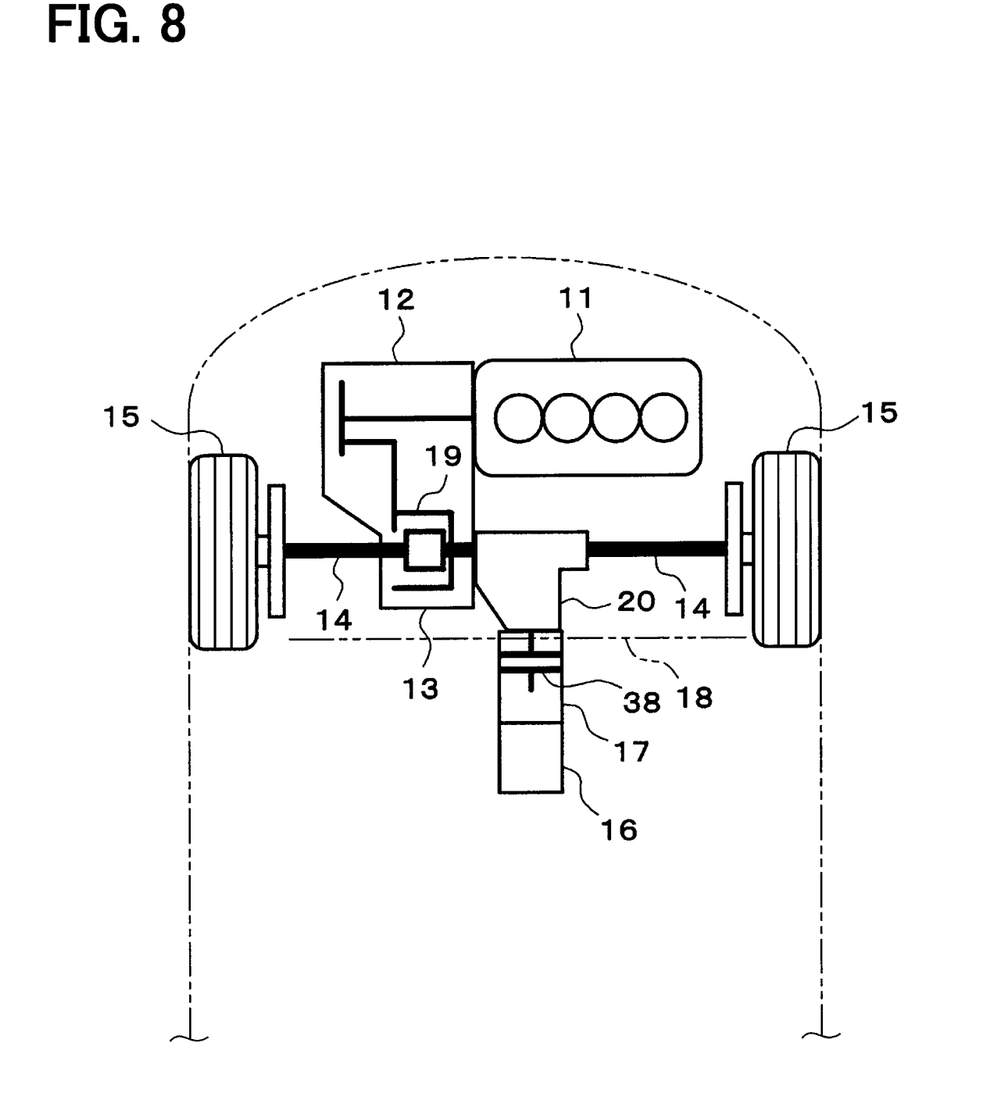
FIG. 8 is a diagram illustrating a general configuration of a drive system of a hybrid vehicle according to the third embodiment (2)

The present third embodiment provides a clutch 38 for transmitting the power or stopping the transmission, between the output shaft of a speed reducer 17 and a transfer 20 as illustrated in FIG. 7. This clutch 38 may be a hydraulic-driven plate type clutch, an electromagnetic-driven electromagnetic clutch, a mechanical dog clutch, or the like. The clutch 38 is provided separately from the speed reducer 17 (i.e., outside the case of the speed reducer 17). As illustrated in FIG. 8, the clutch 38 may be provided integrally with the speed reducer 17 (i.e., in the case of the speed reducer 17).

The above-described present third embodiment provides the clutch 38 between the output shaft of the speed reducer 17 and the transfer 20. This can eliminate the energy loss due to the co-rotation of an MG 16 and the speed reducer 17 (i.e., energy loss due to the rotation load of the MG 16 and the speed reducer 17) by disconnecting the clutch 38 (e.g., by separating the clutch 38 in the engine travel mode) if needed. Thus, the fuel efficiency can be improved. Furthermore, when the MG 16 is failed, the vehicle can continue to self-travel by an engine 11 by detaching the clutch 38. In addition, the maximum rotation speed of the speed reducer 17 and the MG 16 does not need to correspond up to the vehicle maximum speed, and thus the system can be configured at a lower cost.

Fourth Embodiment

A fourth embodiment will be described with reference to FIGS. 9 and 10. Substantially the same part as the above first and third embodiments is given the same corresponding reference numeral to leave out or simplify its description, and different parts from the first and third embodiments will be mainly explained.

Figure 9:
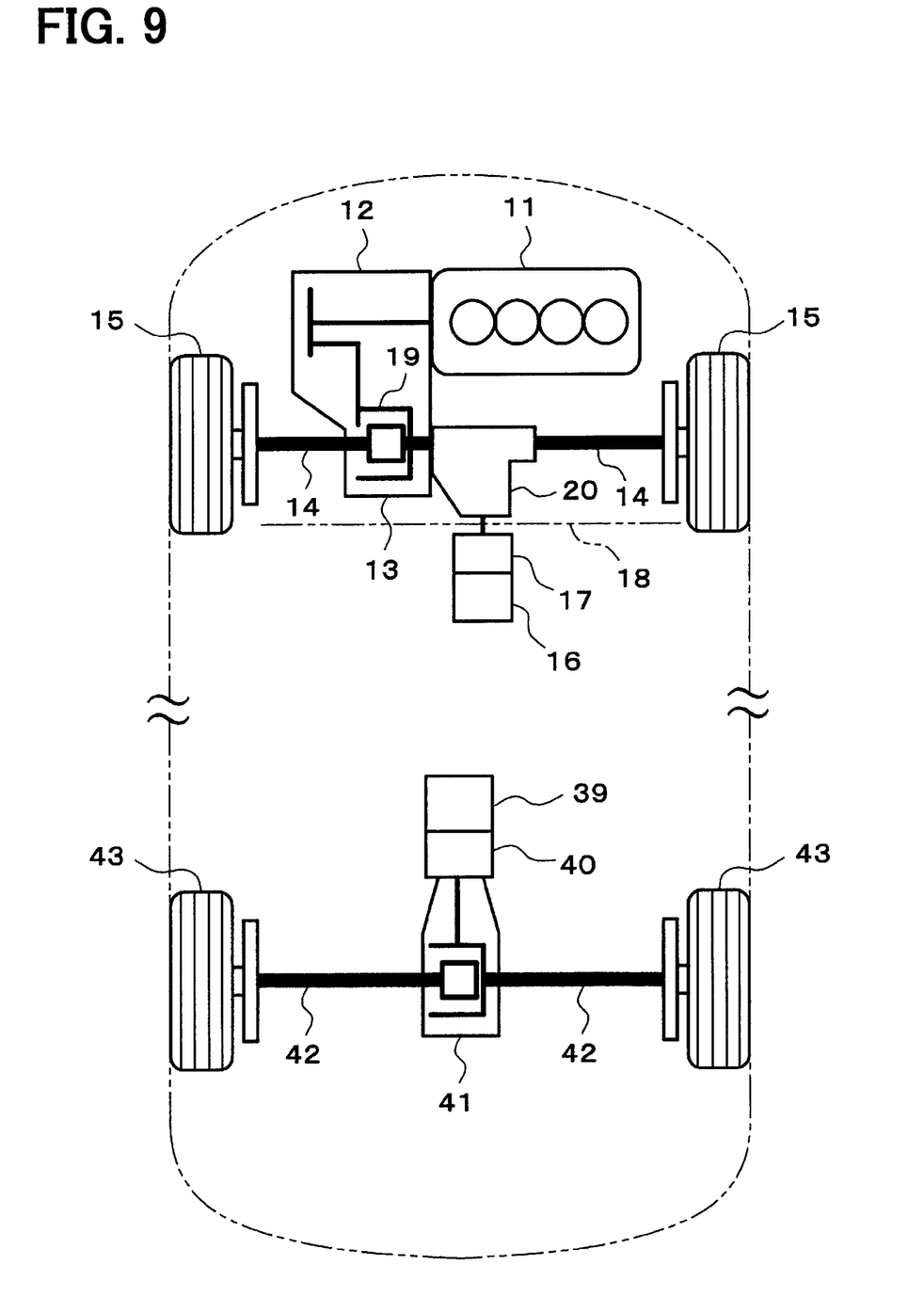
FIG. 9 is a diagram illustrating a general configuration of a drive system of a hybrid vehicle in accordance with a fourth embodiment (1)

In the present fourth embodiment, as illustrated in FIG. 9, the drive system for driving front wheels is configured similar to the above first embodiment (see, e.g., FIG. 1) but furthermore a drive system for driving rear wheels is added. Specifically, a small-diameter MG 39 and a small-diameter speed reducer 40 connected to this MG 39 are disposed on a rear side part of the vehicle. The MG 39 and the speed reducer 40 are arranged longitudinally such that the axial direction of their output shaft accords with the front-rear direction of the vehicle. The power of the output shaft of the MG 39 is transmitted to the speed reducer 40, and the power of the output shaft of this speed reducer 40 is transmitted to a drive shaft 42 of rear wheels 43 (vehicle wheels) via a differential gear mechanism 41 and so forth.

Similar to the MG 16 and the speed reducer 17 for driving front wheels, the MG 39 and the speed reducer 40 for driving rear wheels are arranged along a floor tunnel 22. The outer diameters of the MG 39 and the speed reducer 40 are set such that at least the upper part side (preferably entire part) of the MG 39 and the speed reducer 40 is accommodated in the floor tunnel 22 and that the lowest surfaces of the MG 39 and the speed reducer 40 are located on an upper side of the lowest surface of the vehicle. Moreover, a liquid refrigerant may be sealed in the case of the MG 39 (or a solid for heat release may be disposed).

Figure 10:
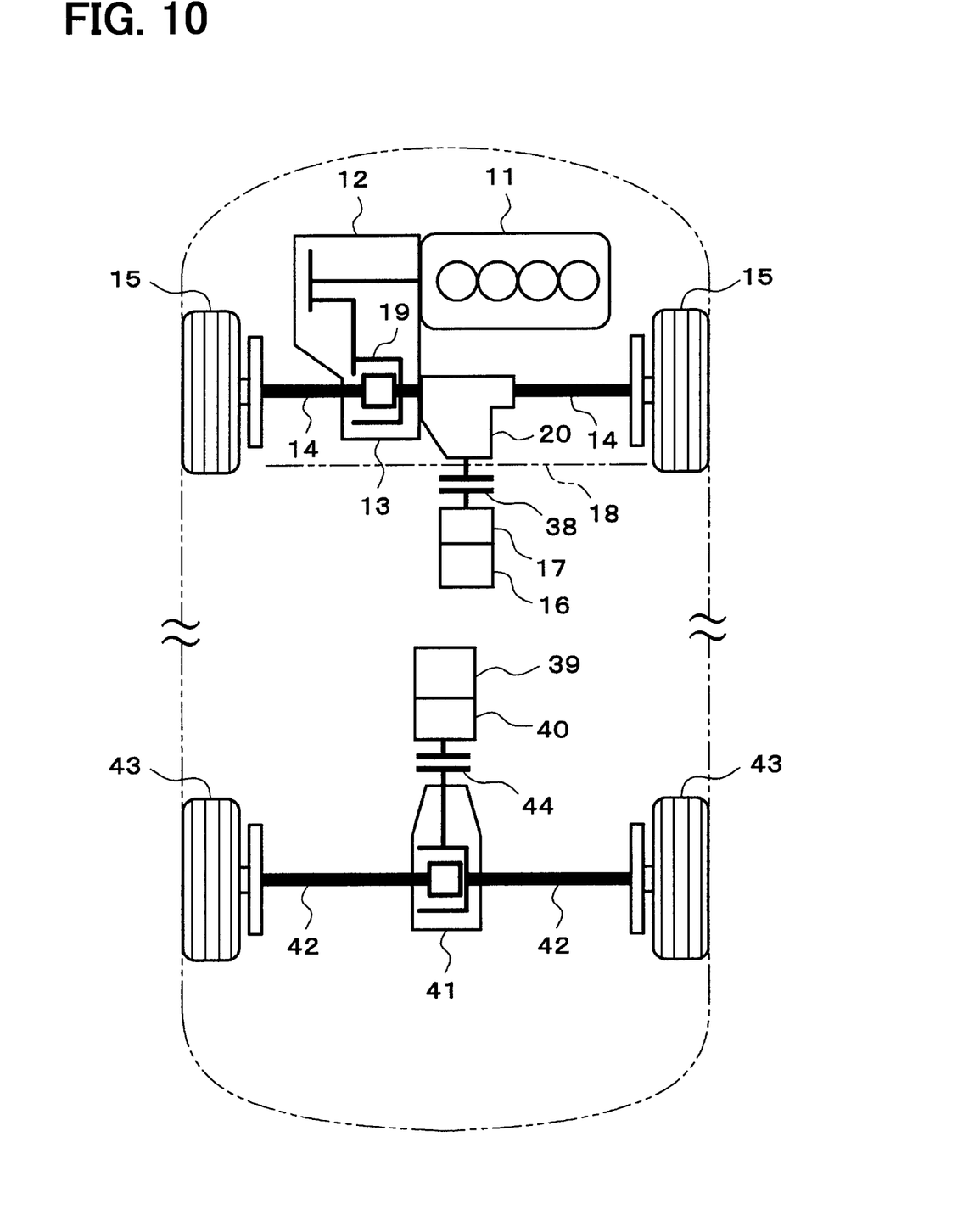
FIG. 10 is a diagram illustrating a general configuration of a drive system of a hybrid vehicle according to the fourth embodiment (2).

As illustrated in FIG. 10, there may be employed a configuration that provides a clutch 38 between the output shaft of the speed reducer 17 and the transfer 20 in the drive system for driving front wheels and that provides a clutch 44 between the output shaft of the speed reducer 40 and the differential gear mechanism 41 in the drive system for driving rear wheels. Or, the configuration may remove either one of the clutch 38 and the clutch 44.

The above-described present fourth embodiment provides the MG 39 and the speed reducer 40 for driving rear wheels separately from the MG 16 and the speed reducer 17 for driving front wheels. This can make the vehicle four-wheel-drive thereby to improve its traveling performance and stability on a rough road or on a slippery road surface. Additionally, the power required for the EV travel can be divided by the two motor generators: front MG 16 and rear MG 39. Thus, depending on the vehicle speed and acceleration, using efficiently the two motor generators: MG 16 and MG 39 can reduce the electric power consumption.

In the first to fourth embodiments, the MG 16 and the speed reducer 17 are arranged outside the engine compartment that accommodates the engine 11 and the transmission 12. However, instead of this configuration, the MG 16 and a part of the speed reducer 17 may be configured to be arranged outside the engine compartment (e.g., part of the speed reducer 17 configured to be disposed in the engine compartment).

In the first to fourth embodiments, the output shaft of the speed reducer 17 is connected through the existing transfer 20 for a four-wheel drive vehicle. However, instead of this configuration, the output shaft of the speed reducer 17 may be configured to be connected through a power transmission mechanism exclusively for a hybrid vehicle.

The first to third embodiments apply the present disclosure to the drive system for driving front wheels, but instead of this application, the present disclosure may be applied to the drive system for driving rear wheels. In addition, the fourth embodiment may employ a configuration inverting the front and the rear (i.e., configuration switching between the drive system for driving front wheels and the drive system for driving rear wheels).

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A device for driving a vehicle including:
   an engine that is a power source of the vehicle; and
   a transmission that is connected to the engine, wherein the engine and the transmission are arranged transversely such that an axial direction of an output shaft of the engine accords with a right-left direction of the vehicle, the device comprising:
   a motor generator (MG) that is a power source of the vehicle;
   a speed reducer that is connected to the MG; and
   a liquid refrigerant that is sealed in a case of the MG so that the refrigerant does not circulate to communicate with outside of the MG; wherein:

the MG and at least a part of the speed reducer are arranged outside of an engine compartment that accommodates the engine and the transmission; and an output shaft of the speed reducer is connected to a power transmission system, which transmits power of an output shaft of the transmission to a drive shaft of a vehicle wheel, to be capable of transmitting power to the power transmission system.

2. The device according to claim 1, wherein the MG includes a stator winding wire, which is a segment-type winding wire that is formed by joining a plurality of conductor segments.

3. The device according to claim 1, wherein the refrigerant has insulating properties.

4. The device according to claim 1, wherein:
the MG includes a rotor; and
the refrigerant is stored in the case of the MG up to at least a position where a bottom surface side of an outer peripheral part of the rotor is submerged.

5. A device for driving a vehicle including:
an engine that is a power source of the vehicle; and
a transmission that is connected to the engine, wherein the engine and the transmission are arranged transversely such that an axial direction of an output shaft of the engine accords with a right-left direction of the vehicle, the device comprising:
a motor generator (MG) that is a power source of the vehicle;
a speed reducer that is connected to the MG; and
a solid for heat release that is disposed in a case of the MG to be in contact with at least a coil end part of a stator winding wire of the MG and an inner surface of the case; wherein:
the MG and at least a part of the speed reducer are arranged outside of an engine compartment that accommodates the engine and the transmission; and
an output shaft of the speed reducer is connected to a power transmission system, which transmits power of an output shaft of the transmission to a drive shaft of a vehicle wheel, to be capable of transmitting power to the power transmission system.

6. The device according to claim 5, wherein the stator winding wire of the MG is a segment-type winding wire that is formed by joining a plurality of conductor segments.

7. The device according to claim 5, wherein the solid has insulating properties.

8. The device according to claim 5, wherein the solid is disposed not to be in contact with a rotation member of the MG.

9. A device for driving a vehicle including:
an engine that is a power source of the vehicle; and
a transmission that is connected to the engine, wherein the engine and the transmission are arranged transversely such that an axial direction of an output shaft of the engine accords with a right-left direction of the vehicle, the device comprising:
a motor generator (MG) that is a power source of the vehicle; and
a speed reducer that is connected to the MG; wherein:
the MG and at least a part of the speed reducer are arranged outside of an engine compartment that accommodates the engine and the transmission; and
an output shaft of the speed reducer is connected to a power transmission system, which transmits power of an output shaft of the transmission to a drive shaft of a vehicle wheel, to be capable of transmitting power to the power transmission system; and
Tmax, Pmax, and GRtotal are set such that Tmax, Pmax, GRtotal, IW, and Rtyre satisfy relationships of the following expression (1) and the following expression (2):

$$T\max \times GR\text{total} > IW \times 1.05 \times R\text{tyre} \tag{1}$$

$$P\max > |20.61 \times (-0.79) \times IW| \tag{2}$$

where:
Tmax is a maximum torque of the MG;
Pmax is a maximum output of the MG;
GRtotal is a total speed reduction ratio that is determined by a speed reduction ratio of the speed reducer and a final speed reduction ratio;
IW is a weight of the vehicle; and
Rtyre is a tire radius of the vehicle.

10. A device for driving a vehicle including:
an engine that is a power source of the vehicle; and
a transmission that is connected to the engine, wherein the engine and the transmission are arranged transversely such that an axial direction of an output shaft of the engine accords with a right-left direction of the vehicle, the device comprising:
a motor generator (MG) that is a power source of the vehicle; and
a speed reducer that is connected to the MG; wherein:
the MG and at least a part of the speed reducer are arranged outside of an engine compartment that accommodates the engine and the transmission;
an output shaft of the speed reducer is connected to a power transmission system, which transmits power of an output shaft of the transmission to a drive shaft of a vehicle wheel, to be capable of transmitting power to the power transmission system; and
outer diameters of the MG and the speed reducer are set such that the MG and at least an upper part side of the speed reducer are accommodated in a floor tunnel formed on a floor panel of the vehicle, and that the lowest surfaces of the MG and the speed reducer are located on an upper side of the lowest surface of the vehicle including the floor panel and an assembling part.

* * * * *